United States Patent [19]
Nielsen

[11] Patent Number: 4,606,200
[45] Date of Patent: Aug. 19, 1986

[54] MODULAR CUSTARD FREEZING MACHINE

[76] Inventor: Steven L. Nielsen, 177 E. Oakridge Dr., Bountiful, Utah 84101

[21] Appl. No.: 757,243

[22] Filed: Jul. 22, 1985

[51] Int. Cl.$^4$ .................... F25D 23/02; A23G 9/00
[52] U.S. Cl. .................................. 62/302; 62/242; 29/824; 366/149; 251/292
[58] Field of Search ............... 62/298, 302, 342, 343; 366/149; 165/78; 29/822–824; 251/96, 292

[56] References Cited

U.S. PATENT DOCUMENTS

| | | | |
|---|---|---|---|
| 1,162,935 | 12/1915 | Lange | 251/292 X |
| 1,576,000 | 3/1926 | Majors | 251/292 |
| 1,887,344 | 11/1932 | Wise | 251/292 |
| 1,993,130 | 3/1935 | Ballew | 62/342 X |
| 2,527,894 | 10/1950 | Tacchella | 62/342 X |
| 2,879,027 | 3/1959 | Mueller | 251/292 |
| 3,062,021 | 11/1962 | Grose | 62/342 |
| 3,230,733 | 1/1966 | Rutishauser et al. | 62/302 X |
| 3,323,625 | 6/1967 | Webster | 62/302 X |
| 3,367,126 | 2/1968 | Howell | 62/342 X |
| 3,712,078 | 1/1973 | Maynard et al. | 62/298 X |
| 3,766,749 | 10/1973 | Livesay | 62/298 X |
| 4,019,339 | 4/1977 | Anderson | 62/302 X |
| 4,441,334 | 4/1984 | Cysilletti | 62/342 X |
| 4,457,140 | 7/1984 | Rastelli | 62/298 X |

FOREIGN PATENT DOCUMENTS

| | | | |
|---|---|---|---|
| 13365 | of 1911 | United Kingdom | 251/96 |
| 214781 | 5/1924 | United Kingdom | 251/96 |

*Primary Examiner*—William E. Tapolcai
*Attorney, Agent, or Firm*—M. Reid Russell

[57] ABSTRACT

A modular custard freezing machine housed in a cabinet that consists of interior support members whereto panels are releasably connected and supports components of the machine including: a deep pan in the cabinet top for receiving a custard mix poured therein to pass that mix, on demand, through a valve that directs the mix flow into a freezing barrel of a custard freezing chamber; the custard freezing chamber includes the freezing barrel, a coolant gas chamber therearound with a layer of insulation formed around that freon or other coolant gas chamber and contained within a housing that is mounted to a platform; the platform further includes mounted thereto, aligned bearing mounts whereto aligned bearings are secured to receive a shaft journaled therethrough, the shaft further including a pulley thereon that is turned through a belt by an electric motor, and connected to a collar whereto a shaft of a paddle assembly is splined; which paddle assembly is arranged for turning in the freezing barrel, congealing mix therein, which mix is extruded therefrom through a valve arranged in the cabinet front panel. The platform mounted custard freezing chamber, paddle assembly turned therein and the arrangement for turning that paddle assembly constitute a module that can be easily installed in and removed from the custard freezing machine cabinet for repair or replacement.

12 Claims, 7 Drawing Figures

MODULAR CUSTARD FREEZING MACHINE

BACKGROUND OF THE INVENTION

1. Field of the Invention

The invention relates to machines for freezing to a viscose state a mix of sugar, eggs and milk to form a confectionary known as soft ice cream or frozen custard for sale to the public in cones or cups.

2. Prior Art

Soft ice cream and even frozen custard making machines have long been known and in common use and all employ similar structure. Specifically, earlier devices, have all included a freezing chamber that is maintained within a box type housing or cabinet, wherein a plurality of blades are turned to churn the mix. The chamber is cooled by introduction of freon or like expansive gas therearound and is usually insulated to maintain or retain cold within and around that chamber.

Prior to the present invention, such earlier devices have not employed a modular freezing chamber and related components to include a blade assembly turning therein along with the means for turning that assembly arranged as a module to be conveniently removable. This modular assembly, including the machine components, are those that most often fail and need repair or replacement. Unlike the present invention, earlier machines have utilized freezing chambers and turning blades arranged as individual assemblies within a cabinet. Such chamber has been secured in that cabinet with freon or like gas transfer tubes or pipes wrapped therearound, and insulation coated thereover limited access and making removal difficult or impossible. Such arrangements have necessitated, when the freezing chamber or blade turning components are damaged or defective, that the whole machine to be torn down and repaired in place, rather than, as with the present invention, the repair made by a replacement of a modular freezing chamber only. The modular custard freezing chamber assembly of the present invention can be easily removed, greatly simplifying machine maintenance, and insuring that the machine will not be down or inoperable for a significant period of time so as to cause a loss of business. Further, as the present invention, similar to earlier machines, normally employs two freezing chambers, by having the one chamber separately removable from the machine as does the present invention the operation of the other freezing chamber is not disrupted, allowing the machine to continue to operate even while one of the chambers is being repaired.

Additionally, freezing machines generally involve valve arrangements associated with a vessel for dispensing mix from that vessel that gravity feeds into a freezing chamber or barrel. Such outlets are usually a type of gate valve arrangement that are operated at the vessel outlet. The present invention, like such earlier devices, also employs a vessel located in the cabinet top wherein mix is poured to flow therefrom into a freezing chamber or barrel and incorporate such gate valve thereat. Unique to the present invention is a novel valve control that is arranged to be turned remotely to operate the mix control valve to pass mix into a freezing chamber or barrel inlet. Where earlier machines have required that an operator physically reach inside the cabinet, proximate to turning belts to adjust that flow, the valve control of the present invention allows an operator entry from without the housing, to control flow of the mix into the freezing chamber or barrel.

SUMMARY OF THE INVENTION

It is the principal object of the present invention in a custard freezing machine to provide a modular custard freezing chamber that is convenient for installation in and removal from the machine and, includes a paddle assembly for turning within a freezing barrel and drive shaft and pulley linkage for turning that paddle assembly, all of which components are mounted together as a single module.

Another object of the present invention is to provide the custard freezing chamber, paddle assembly and paddle turning arrangement mounted on a skid or railed platform, as the modular arrangement to be easily removable as a unit.

Still another object of the present invention is to provide a mix flow control arrangement whereby an operator, from without the custard freezing machine cabinet, can control the flow rate of a liquid mix from a mix holding vessel into a custard freezing barrel.

In accordance with the above objects, the present invention in a modular custard freezing machine includes a housing or cabinet that is constructed of interconnected frame members to receive fitted panels releasably secured thereto, the panels close the cabinet, which cabinet includes, on the top thereof, at least one deep pan with cover to receive a custard mix consisting of milk, eggs and sugar poured therein. In practice, the custard freezing machine cabinet usually contains two or more custard freezing assemblies that are essentially identical and, therefor, a description of one should be taken as a description of the other custard freezing assembly also.

Each deep pan mounted in the cabinet top includes a drain whereover a mix flow control valve is arranged. The flow control valve, in turn, is operable from without the housing by an operator pushing and turning a remote handle mounted in a back or rear panel that operates a linkage. This linkage preferably involves a rod or shaft that is connected on one end to turn that valve and includes a spring biased collar that connects to the handle without the cabinet. The handle is depressible by the operator against the spring biasing to fit a blade portion into a notch or groove that is formed across the opposite shaft end to its connection to the mix control valve. Turning of that handle thereby turns the shaft to operate the mix control valve, and pass a mix flow therethrough that falls into a funnel of the custard freezing chamber.

The custard freezing chamber includes a freezing barrel that is surrounded by a freon or other coolant gas chamber that is, in turn, surrounded by a covering of insulation and is enclosed in a housing that is mounted to a skid or platform, the freezing barrel to receive a churn or paddle assembly to turn therein. Paddle assembly turning is provided by a shaft that includes a pulley and is supported between bearings that are also mounted to the skid or platform. The custard freezing chamber components mounted to the skid or platform constitute a module that can be easily mounted within the cabinet as a unit, with the pulley to receive and is turned by an electric motor driven belt, which electric motor is located within the cabinet bottom area.

In operation, turning of the blade assembly rotates blades that turn along the freezing barrel wall, scraping mix therefrom as it congeals and folding that congealing mix during the custard freezing process.

The custard freezing machine is preferably fabricated to have two such custard freezing chambers and support components as individual systems. Each system includes individual electric motors for driving the paddle assembly thereof, and may involve either separate freon cooling systems, or a single system that has a capability for isolating one or the other of the custard freezing chambers. The present invention also includes appropriate electrical controls for operating the various components of the modular custard freezing machine and appropriate indicator lights are included on the cabinet front and rear panels.

These and other objects and features of the present invention shall become more fully apparent from the following detailed description and dependent claims.

DESCRIPTION OF THE DRAWINGS

In the drawings that illustrate that which is presently regarded as the best mode for carrying out the invention.

Figure 1:
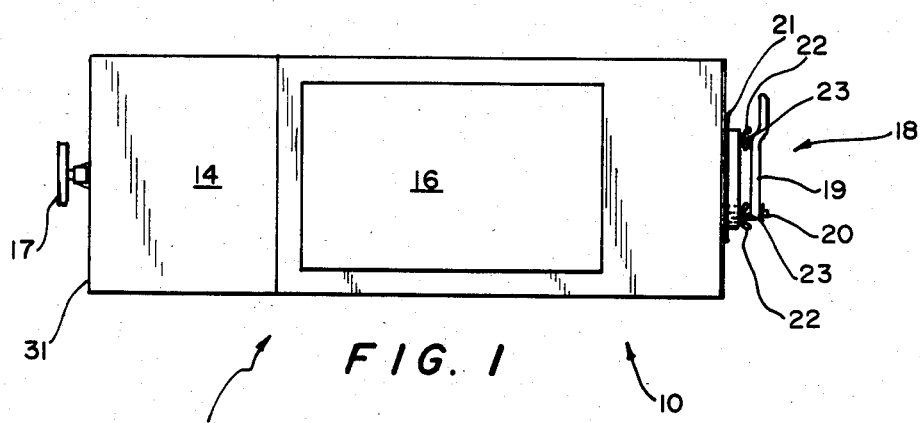
FIG. 1, is a top plan view of a cabinet containing a single freezing chamber of the custard freezing machine of the present invention showing the cabinet as including a removable top for fitting over a deep pan wherein a custard mix is poured.
Figure 3:
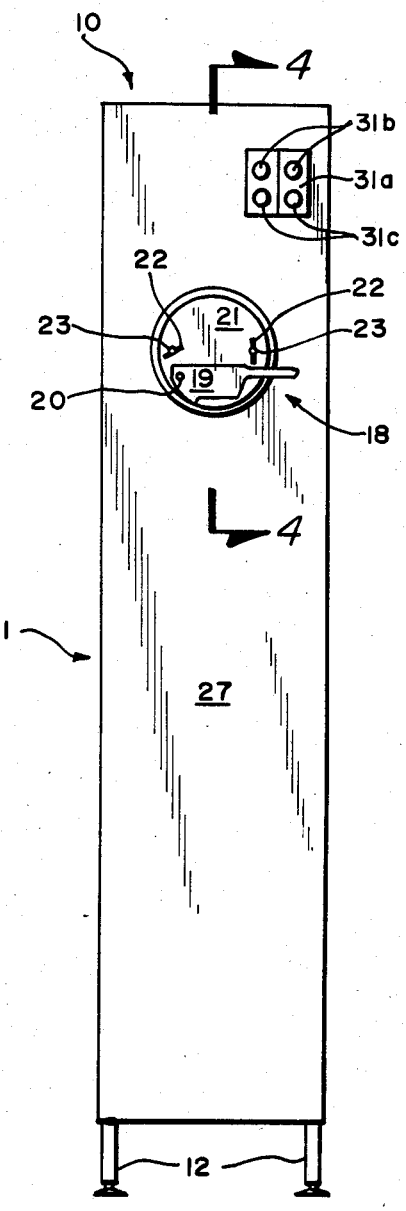
Figure 4:
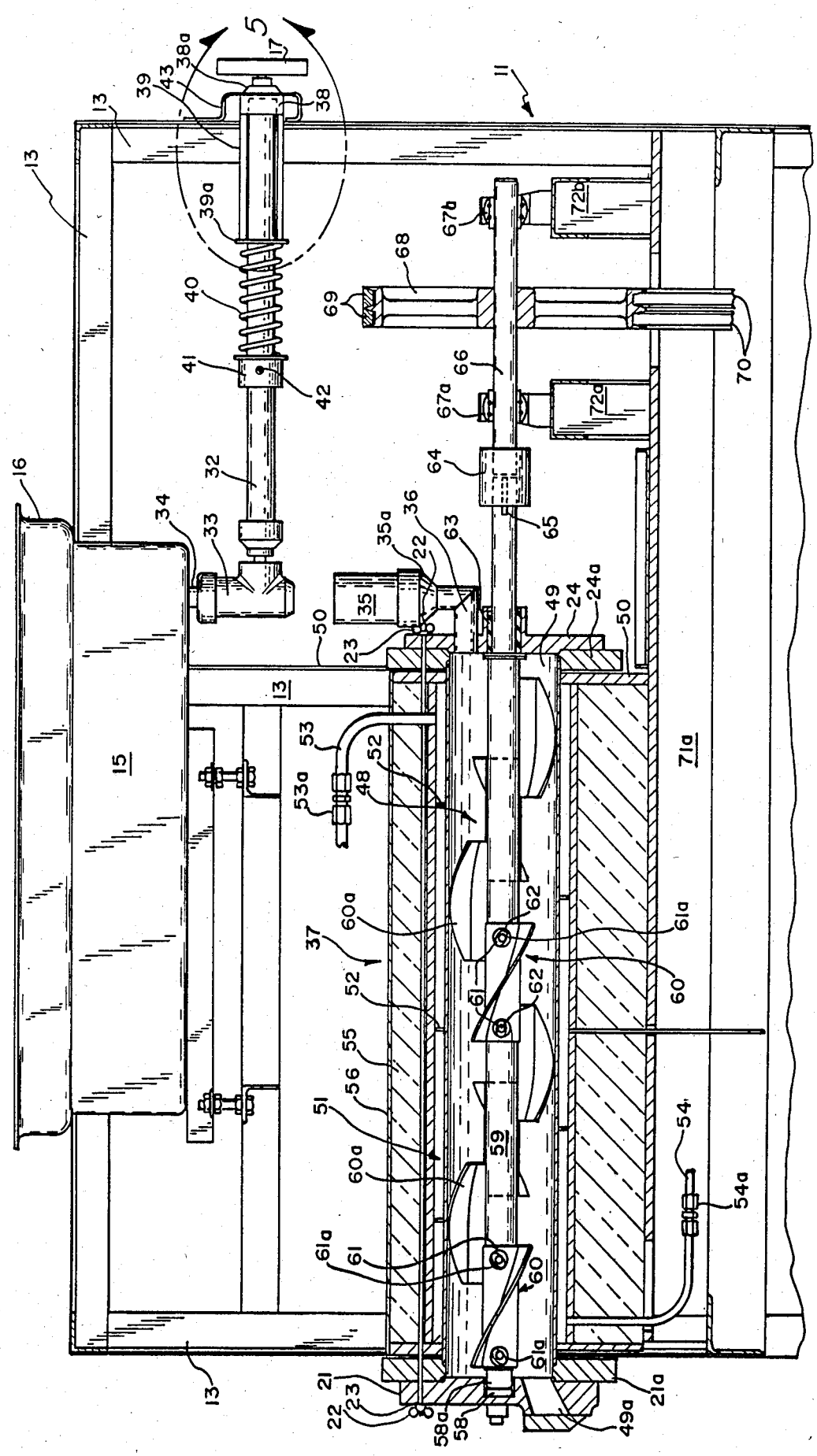
Figures 5, 5A:
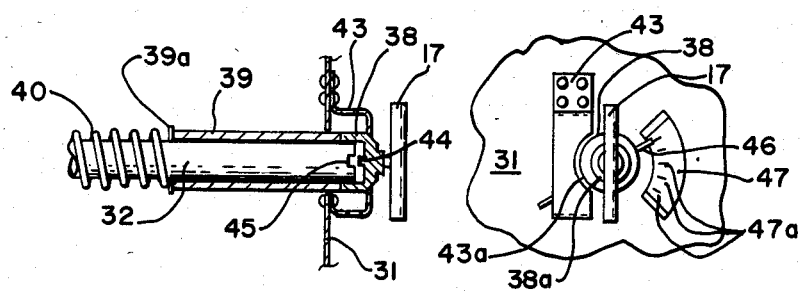
Figure 6:
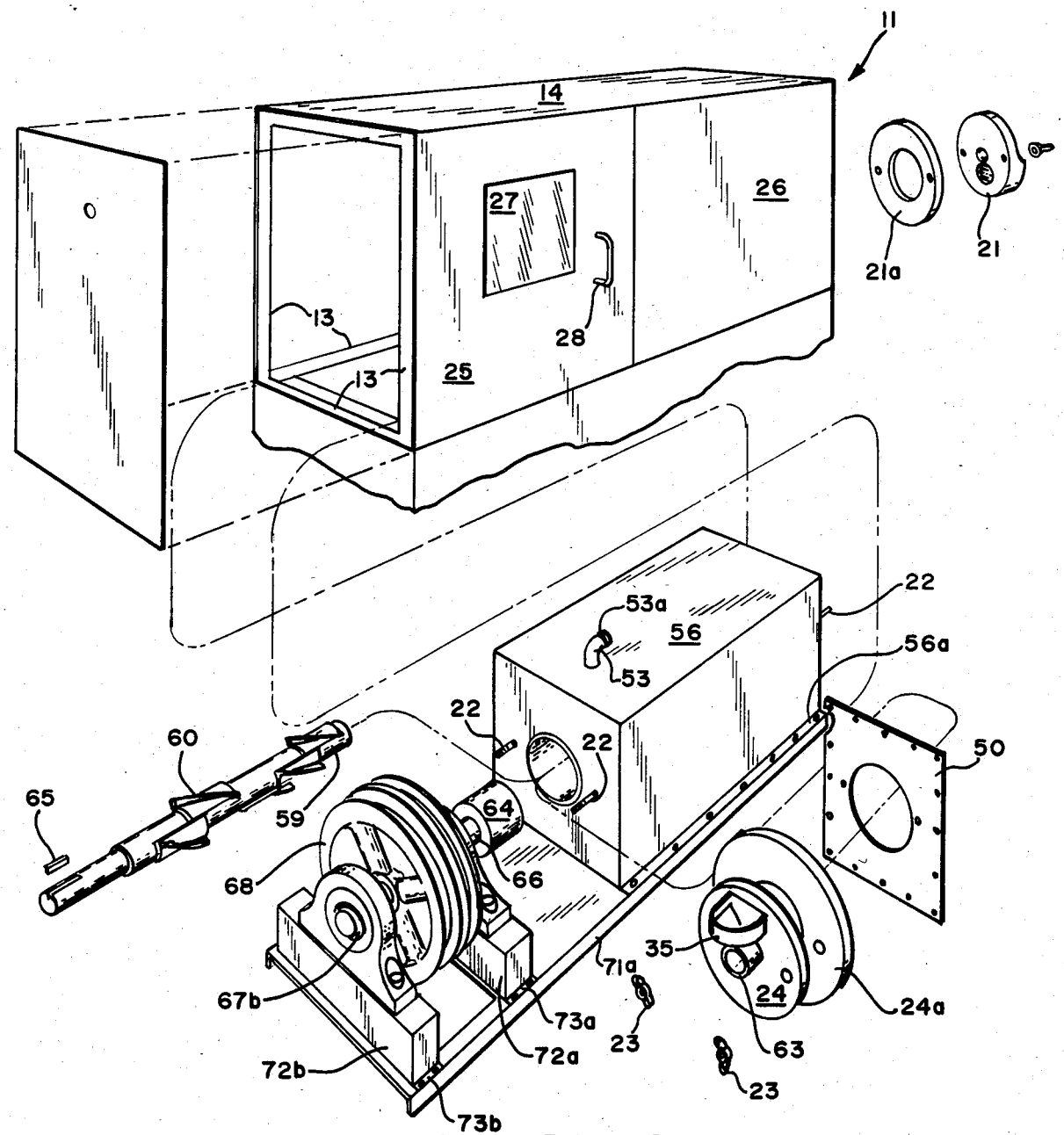

FG. 3 is a front elevation view of the front of the custard freezing machine of FIG. 1;

FIG. 4 is a side elevation sectional view taken along line 4—4 of FIG. 3 exposing the interior of the top portion of the custard freezing machine to show therein a mix feed arrangement and custard freezing chamber and components that includes a blade assembly within a freezing barrel of that chamber, which blade arrangement includes a shaft supported between bearings with a pulley mounted thereto, the chamber components mounted to a platform as a module;

FIG. 5 is a profile sectional view of a control for a mix control valve taken within the line 5 of FIG. 4 shown the control as including a handle that is journaled in the cabinet rear panel and is spring biased out of turning engagement with a shaft for turning that mix control valve;

FIG. 5A is a front elevation view of the handle of FIG. 5 in a broken away portion of the cabinet rear panel, showing the handle with a connected pointer that is arranged to travel between stops; and FIG. 6 is an exploded perspective view showing the skid or platform mounted custard freezing chamber and associated components exploded apart and from the custard freezing machine cabinet top of FIG. 4.

DETAILED DESCRIPTION

Figure 2:
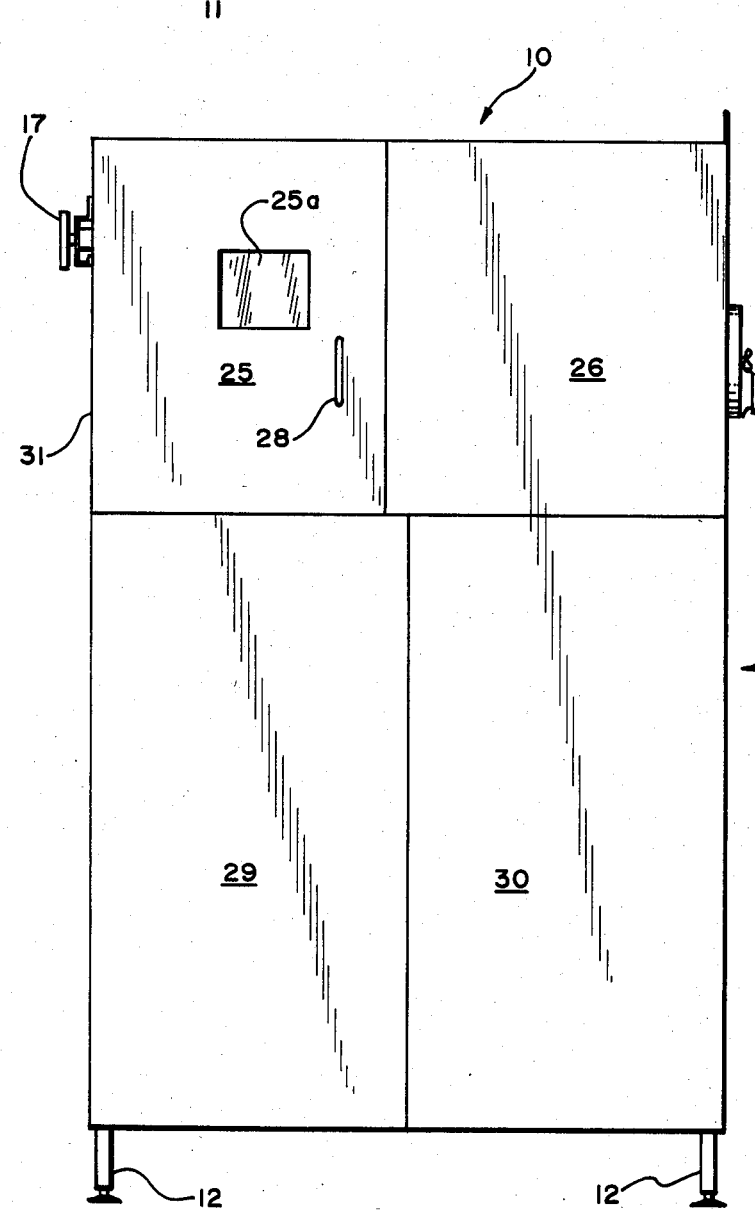
FIG. 2 is a side elevation of the cabinet containing the custard freezing machine of FIG. 1 showing on a rear end the cabinet as including a handle arrangement that extends from a rear panel and a knife valve that extends from a front panel, with a window shown arranged in a cabinet side.

Referring now to the drawings, FIGS. 1, 2 and 3 show, respectively, top plan, side elevation, and front elevation views, of a single chambered modular custard freezing machine 10 of the present invention hereinafter referred to as machine 10. FIGS. 1, 2 and 3 show different sides of a cabinet 11 of the machine that utilizes a single custard freezing chamber only. It should be understood, however, that the single custard freezing chambered machine is shown for convenience only and that it is preferred to arrange two such custard freezing chambers and associated components together within a single housing or cabinet. Of course, more than two such chambers could be so arranged within the same cabinet. It should, however, be understood that, whether single or multiple chambers are involved, each will be essentially independent from the other, sharing, only a coolant gas system that includes a liquification arrangement, not shown, and provides for isolating one of the custard freezing chambers from the other. The systems operate independently from one another, and either can be dismantled to correct a malfunction without disrupting operation of the other.

Shown in FIGS. 1, 2 and 3 the single freezing chambered machine cabinet 11 is rectangular in shape and is supported on legs 12. As illustrated in FIG. 4, the cabinet is preferably constructed to have a frame formed of box or angle iron members 13 whereto are secured panels to close that frame into the box shown. FIG. 1 shows the cabinet as including a top panel 14 that is opened to accommodate a deep pan 15 mounted therein. The deep pan 15 is shown best in FIG. 4, and includes a lid 16 for installation thereover. The lid 16 is arranged to be removable to allow an operator to pour a custard mix into the deep pan that consists, primarily of eggs, milk, and sugar, and is for dispensing into a freezing barrel of the custard freezing chamber, as will be discussed in detail later herein. Additionally, FIG. 1 shows the cabinet as including a handle 17 that extends from a rear panel 31 thereof for operating as will be described, a mix flow control valve from without the cabinet. FIG. 1 also shows a forward panel 27 as including a guillotine type custard dispensing valve 18 hereinafter referred to as dispensing valve, projecting therefrom. The dispensing valve includes a gate 19 that is pivotally connected at 20 to rotate across an opening within a freezing barrel to cut through a column of custard extruding therethrough, as will be described later herein with respect to FIG. 4. Additionally, FIG. 1 shows an edge view of a forward mounting plate 21 that is secured by wing nuts 23 turned over threaded ends of rods 22 that extend, as shown in FIGS. 4 and 6, from the mounting plate 21 through the custard freezing chamber to beyond a rear mounting plate 24, with threaded ends thereof also having wing nuts 23 turned thereto. So arranged, the front and rear plates 21 and 24, respectively, sandwich forward and rear sealing rings 21a and 24b against, respectively, front panel 27 and an intermediate panel 50 as will be described in detail later herein with respect to FIGS. 4 and 6, to secure the custard freezing chamber within the housing.

Shown in the side elevation view of FIG. 2, the cabinet includes upper panels 25 and 26, that are arranged alongside one another in the top portion thereof. Panel 25 includes a window 25a wherethrough a flow of mix from the deep pan 15 into a funnel 35 can be observed. Also, a handle 28 is provided in panel 25 for opening and closing by an operator of that panel, the panel preferably being hinge mounted to the frame 13 along an edge to open easily. The other upper panel 26 is preferably secured as with screws or the like to the housing frame 13. Similarly, FIG. 2 shows lower panels 29 and 30 that are also preferably secured to frame 13 as with screws, or the like fasteners, to close off that lower cabinet area wherein the freon cooling and compressing assembly, not shown, is arranged along with an electric motor, not shown, that drives a churn or paddle assembly through belts, as will be described in detail later herein with respect to FIGS. 4 and 5. The freon refrigeration assembly and electric motors used in the present invention, it should be understood, are preferably like those ordinarily used in similar machines, and so will not be further described herein.

FIG. 3 shows a front elevation view of a front panel 27 of cabinet 11 wherein is arranged the custard dispensing valve 18 in front mounting plate 21. Additionally, panel 27 includes a switch and indicator panel 31a whereon are mounted indicator lights 31b, that are lit when components of the machine are operating, and off/on buttons 31c for turning off and on the components of the machine 10 by an operator depressing and releasing the individual buttons.

FIG. 4, as set out above, shows the cabinet frame structure 13 formed preferably of right angle members to receive the described panels installed thereon, which frame also includes appropriate intermediate and transverse segments for supporting machine components. The deep pan 15 is maintained between such intermediate and transverse segments. A mix control valve 33 extends downwardly from a drain 34 of deep pan 15, in one end thereof. A mix control valve shaft 32 to the mix control valve that, when turned appropriately, opens or closes that valve. The mix control valve, it should be understood, is preferably a standard butterfly type valve, the turning of the shaft 32 controlling the area of the opening therethrough. Flow from the mix control valve gravity feeds mix from the pan 15 into a funnel 35, which funnel inwardly at 35a decreasing in cross section 3 and connects to a right angle feed line 36. The feed line is secured through rear plate 24 to pass the mix therethrough into a freezing barrel 49 of a custard freezing chamber 37, whose arrangement and functioning will be described in detail hereinbelow.

Control of the operation of the mix control valve 33, as set out above, is through shaft 32. Shaft 32 is rotated or turned by turning of handle 17 when that handle is connected to the shaft. To provide for releasable engagement of the handle 17 to shaft 32, as shown in FIGS. 4, 5 and 5A, the handle is mounted to a collar 38 that is, in turn, secured to a sleeve 39. A sleeve end 39a connects to one end of a coil spring 40 wherethrough shaft 32 is fitted. Shaft 32 includes a collar 41 that is secured thereto by appropriately turning a set screw 42 and the collar is connected to the opposite end of spring 40. The spring 40 is compressed to bias the sleeve 39, collar 38 and handle 17 outwardly from cabinet rear panel 31. To retain the collar 38 and handle 17 in the attitude shown in FIGS. 4 and 5 a bracket 43 is secured to panel 31 that fits across and is aligned to be contacted by a sloping side 38a of collar 38. Bracket 43 is notched at 43a to contact a point on the sloping side 38a of collar 38. The collar 38 can thereby travel alongside bracket 43 until the sloping side 38a thereof engages the bracket notch 43a. Thereat, further outward travel of collar 38 and connected handle 17 is blocked. An operator, by depressing or pushing handle 17 towards the rear panel 31, as shown in FIG. 5, can compress coil spring 40 so as to move towards shaft 32 end, a blade 44 that is formed within collar 38 to face oppositely to handle 17 and is opposite to a slot 45 that is formed across the end of shaft 32. By fitting the blade 44 into slot 45, the handle 17 is coupled to shaft 32. The shaft and handle, as shown in FIG. 5A, will thereafter turn between limits. Said travel limits are illustrated by a pointer 46 that extends from collar 38 to travel over calibrations 47a that are formed in a card 47 that is secured to rear panel 31. The opposite end of pointer 46 extends, across collar 38 to travel beneath bracket 43 and above the panel 31 surface between bracket ends 43a and 43b, which bracket ends thereby limit turning of shaft 32, controlling opening of mix control valve 34. In operation, depressing handle 17 to fit blade end 44 into the groove and 45 provides a coupling thereof that is like a screwdriver blade fitted into a slotted screw head. Alternatively, the invention could involve, for example, an opposing bevel gear arrangement on, respectively the collar 38 under surface and shaft 32, not shown, that would mesh when the handle is depressed against the spring biasing, or a like structure could be so employed.

In operation, appropriate turning of the mix control valve 33 by handle 17 is accomplished by a proper positioning of the pointer 46 relative to the calibrations 47a on card 47 and as observed through the window 27 in side panel 25, that was described with respect to FIG. 2.

FIGS. 4 and 6 show the custard freezing chamber 37 as including a churn or paddle assembly 48 that is turned within a freezing barrel 49, arranged within a housing 56 that is maintained at its ends between the cabinet front wall 27 and an interior vertical wall 50. To mount the custard freezing chamber forward and rear mounting plates 21 and 24 are provided that fit over threaded rod ends 22 that extend through the custard freezing chamber. The forward and rear panels with threaded rod ends fitted therethrough receive wing nuts 23 turned thereover sandwiching sealing rings 21a and 24a between, respectively the front and rear mounting plates and the forward and intermediate panels 27 and 50, engaging and sealing against the forward and rear most ends of freezing chambers 49, that fit through the respective forward and intermediate panels 27 and 50 providing a liquid tight seal over the freezing barrel ends. The intermediate wall 50, illustrated best in FIG. 6, like the described exterior panels, is mounted to the frame members 13 by conventional screws or the like and, in the process of dismounting platform mounted custard freezing chamber 37 and components from the cabinet 11, as will be described later herein, the intermediate wall 50 is dismounted after the rear ring seal 24a and rear plate 24 are disconnected.

The freezing barrel 49 of the custard freezing chamber 37 is preferably cylindrical and is fitted into a second cylinder 51 that is a freon or other coolant gas chamber. Within the second cylinder 51, a flow of coolant gas is circulated against baffle 52 around that freezing barrel. An inlet line 54 is provided that connects into the second cylinder to pass coolant gas therethrough after it has passed through an expansion valve that changes liquified freon to gas not shown. The coolant gas adsorbs heat from off the freezing barrel, that heated gas then passing out through outlet line 53 back to a conventional freon cooler and compressor wherein the heat is removed and the gas repressurized back to a liquid state for recirculation. Both coolant inlet and outlet lines preferably include couplings 54a and 53a, respectively for coupling the unit into the machine's coolant system. In practice, the preferred coolant system is contained within the housing 11 behind panels 29 and 30 and is a conventional heat removal and pump arrangement manufactured by Frick Co. identified as BluCold Unit manufactured for use in custard and ice cream making machines.

Around the second cylinder 51 or freon chamber, in contact therewith, is arranged an insulation layer 55 that is preferably formed by injecting insulation in a foam form within a freezing chamber housing 56, the insullation to fully surround and encase that freon or other coolant gas chamber for retaining cold therein.

Shown in FIG. 4, the freezing chamber 49, as set out above, is supported between forward and rear plates and sealing rings. The forward plate 21 includes a bearing recess 58 with a bearing or bushing 58a therein to accommodate a forward end of a paddle assembly 48 shaft 59 installed therein. The paddle assembly in addition to shaft 59 includes, mounted at intervals along and around that shaft, blades 60 that function to stir the custard mix during the custard freezing process. The blades 60 are identical and each is curved appropriately along its outer edge 60a to conform to the freezing barrel interior wall to wipe or scrape mix therefrom as it congeals on that wall surface. Each blade 60, for mounting to shaft 59, includes holes 61 formed proximate to ends thereof along the longitudinal center axis of a curved body portion of the blade. The two holes 61 preferably further include nylon or like plastic washers 61a fitted therein for providing a loose fitting coupling of each pin 62 therethrough. So arranged, the plastic washers will wear during paddle blade turning and can be replaced. The washers 61a receive, in loose fitting engagement, the pins 62 that extend at normal angles from shaft 59 to form a slack or loose coupling. The contact of the blade curved portion 60a with the freezing chamber wall prohibits the indivdual blade from lifting off of a pin 62. So arranged, each blade end is allowed to move around and up and down on its pin 62 coupling to the shaft 59 thereby providing a scraping of the freezing barrel wall without the blade binding thereagainst. In operation, the blade both cleans the freezing barrel wall and mixes and folds that mix as heat is withdrawn therefrom, the mix congealing into a thick mass. Which mix, in its congealed state, can thereafter be dispensed, on demand, through a port 49a that is formed, as shown best in FIG. 4, through the front plate 21. The port 49a is closed over by the custard dispensing valve 18, which valve is opened and closed by appropriately moving a gate 19 across that flow.

Shown in FIG. 4, the paddle shaft 59 is supported through rear plate 24 at a bearing 63 that is secured through that plate, and distal from that bearing the shaft 59 is spline connected into a collar 64 by a key 65. The collar 64, in turn, is secured to a second drive shaft 66 that is supported between bearings 67a and 67b, that are preferably roller bearings. The shaft mounts also include a pulley 68 that is secured axially thereon between the bearings. The pulley 68 includes double grooves 69 around the circumference thereof to receive belts 70. The belts 70, in turn, are fitted over a pulley of an electric motor shaft, not shown, that is a preferably conventional electric motor and is arranged in the cabinet bottom portion behind panels 29.

As shown best in FIG. 4 and the exploded view of FIG. 6, the custard freezing chamber 37 is located within a housing 56 and includes the freezing barrel 48, and a surrounding freon or other coolant gas chamber 51 that has insulation 55 therearound. The freezing chamber housing 56, in turn, includes, along opposite parallel sides, outwardly turned edges 56a, wherein are formed, at spaced intervals, holes for receiving fasteners, such as screws or the like, therethrough for mounting that housing to the sides of a platform 71a. The paddle assembly 48, is shown in FIG. 4. fitted into the freezing barrel, and in FIG. 6 it is shown removed from the freez ing barrel and disconnected from its spline connection to the collar 64. Shown in FIG. 4, the paddle assembly will be turned by the turning of shaft 66, as described. The turning of shaft 66 is supported at bearings 67a and 67b that are arranged on mounts 72a and 72b that each include, as shown in FIG. 6, along lower edges of opposite ends thereof, outwardly projecting lips 73a and 73b, respectively. Lips 73a and 73b include holes therethrough for receiving screws or like fasteners that couple into platform 71a mounting said bearing assemblies thereto. So arranged, the custard freezing chamber housing 56 and bearing assemblies are secured to the platform 71a, the arrangement consituting a module assembly of the custard freezing chamber, the paddle assembly, and paddle turning arrangement. These are the components of the machine 10 that will most often require repair and replacement. In practice, the platform 71a preferably includes rail edges that can be easily slid into the cabinet, along horizontal frame members 13, and thereafter fasteners are attached between that platform and the frame members to secure that platform appropriately within and to the cabinet frame.

FIG. 6 shows an exploded view of the custard freezing chamber housing 56 with the bearing assembly mounted on platform 71a removed from the cabinet. Additionally, FIG. 6 shows the paddle assembly exploded therefrom along with certain components as they are sequentially disconnected and removed to allow for removal of the modular assembly. These elements are, of course, the forward and rear plates 21 and 24 and sealing rings 21a and 24a, that are fitted across the respective custard freezing chamber 37 ends by turning of the wing nuts 23 over rod threaded 22 ends that extend through the custard freezing chamber housing 56. After removal of these wing nuts, these seal rings and cover plates can be seqentially removed. Whereafter, the cabinet interior wall 50 is disconnected and removed from within the cabinet and belts 70 are turned off the pulley 68, the modular assembly then ready to be dismounted from the cabinet frame 13 for repair or replacement.

In practice, fitting the modular assembly back into the cabinet 11 is a reverse of the above, except that each blade 60 of the paddle assembly 48 is positioned, in turn, on shaft 59 as it is slid into the freezing barrel 49. In such assembly such blade hole 61 lined with washer 61a receives a pin 62 fitted therein until the shaft forward end fits through sealing ring 21a and into the bearing 58a in front plate 21. Thereafter the rear sealing ring is slid over shaft 59 and the rear plate 24 bushing 63 is slid along that shaft 59 to the attitude shown in FIG. 4. The forward plate 21 is moved forward of the front panel 27 to allow the shaft 59 to fit into collar 64. Thereby, the blade turning assembly is connected together whereafter the forward and rear plates are secured over rod threaded ends 22, as described, by turning wing nuts 23 thereover sandwiching sealing rings 21a and 24a therebetween. The shaft 59 is thereby supported between end bearing 58a and bearing 63.

The custard freezing chamber and components are maintained, as a module on the plate 71a for movement into and out of the assembly through the cabinet back. In practice, this arrangement allows for the repair and replacement with another module of the assembly or components in a minimum amount of time, without disruption of the operation of another custard freezing chamber arranged within the cabinet 11.

While the invention in a modular custard freezing machine has been shown and described herein in a preferred form, it should understood that the invention may be embodied in other forms without departing from spirit or essentially characteristics set out herein. The described embodiment is, therefore, to be considered, in all respects, as illustrative and made by way of example only and that variations thereto, within the scope of the disclosure, are possible without departing from the subjectmatter coming within the scope of the following claims, which claims I regard as my invention.

I claim:

1. A modular custard freezing machine comprising, a cabinet for containing components of the custard freezing machine that includes interior support members for supporting certain of said components; pan means supported within said cabinet to receive and hold a custard mix therein and to pass that mix through a drain thereof; a mix control valve for fitting across said pan means drain for controlling mix flow therefrom and passing it into a freezing barrel of a custard freezing chamber that includes, a shaft that is secured on one end to turn a flow control means within said mix control valve, said shaft including a collar secured intermediate thereon that connects to one end of a spring means that is telescoped over said shaft which spring means opposite end is connected to a sleeve that is also telescoped over said shaft end distal from said coupling to said flow control means, which sleeve includes a handle means secured across its end, with said spring means fitted through said sleeve to bias said handle means outwardly, which handle means is arranged for turning by an operator from without the cabinet and includes, opposite to the end of said shaft, an engaging means for coupling to and turning said shaft, and means on said shaft end for coupling to and to be turned by said engaging means when said handle means is depressed against the biasing of said spring means, stop means to limit travel of said handle means responsive to said spring biasing; a platform means whereon said custard freezing chamber that includes said freezing barrel surrounded by a coolant gas chamber and insulation is arranged, which platform means also includes mounts secured thereto aligned with an open end of said freezing barrel that include bearings wherethrough a shaft is fitted, said shaft arranged to turn a paddle assembly journaled within said freezing barrel; means for turning said paddle assembly; means for releasably aligning and securing said platform means to said support members within said cabinet; means for supplying a source of coolant gas under pressure to said coolant gas chamber; means for closing off the ends of said freezing barrel that include means for passing mix into said freezing barrel, bearing means for supporting turning of said paddle assembly within said freezing barrel, and means for dispensing, on demand, congealed mix from said freezing barrel; and means for controlling operation of the components of the modular custard freezing machine.

2. A modular custard freezing machine as recited in claim 1, wherein the pan means is maintained to support members within the cabinet to extend above the cabinet top and includes a cover for fitting thereacross.

3. A modular custard freezing machine as recited in claim 1, wherein the engaging means on the handle means is a blade and the means on the shaft end for receiving and coupling to said engaging means is a groove formed into and across said shaft end to receive said blade therein to be turned by said blade.

4. A modular custard freezing machine as recited in claim 1, wherein the custard freezing chamber arranged on said platform means is maintained between forward and intermediate cabinet panels by securing forward and rear mounting plates over said custard freezing chamber ends, as the means for enclosing over ends of the freezing barrel, and means for releasably securing said forward and rear mounting plates to said custard freezing chamber.

5. A modular custard freezing machine as recited in claim 1, wherein the shaft is composed of two shaft sections that are releasable spline connected together.

6. A modular custard freezing machine as recited in claim 5, wherein the paddle assembly includes one shaft section whereto are arranged outwardly projecting pins, that are secured, at spaced intervals thereon and are staggered therearound; to receive blade means for arrangement on said pins, each blade means including holes formed through ends of a shaft engaging portion thereof to fit over a pin, which holes are larger in diameter than each said pin and each hole includes a washer means arranged therein wherethrough a pin is fitted, said washer means to wear during paddle assembly turning and can be replaced when worn out, and each said blade means includes a body portion that extends outwardly from said shaft engaging portion and includes an outer edge that is curved to conform to the inner surface of the freezing barrel for scraping said freezing barrel inner surface.

7. A modular custard freezing machine as recited in claim 6, wherein the washer means are nylon washers.

8. A modular custard freezing machine as recited in claim 1, wherein the means for dispensing, on demand, congealed mix from said freezing barrel is a guillotine type valve that includes a gate means that is pivotally coupled to said forward mounting plate to travel across an opening through said forward mounting plate wherethrough congealed mix is extended.

9. A modular custard freezing machine as recited in claim 1, wherein the platform means includes rails along opposite longitudinal edges for resting onto cabinet support members; and means for releasably securing said platform to said cabinet support members.

10. A modular custard freezing machine as recited in claim 1, wherein coupling means are provided on coolant gas inlet and exhaust lines for disconnecting the source of coolant gas from the custard freezing chamber.

11. A remote liquid mix control valve for a custard freezing machine maintained in a housing that provides for a gravity feed of a liquid mix from a supply vessel into a freezing barrel of the freezing machine comprising, a shaft that is secured on one end to turn a flow control means within said mix control valve, said shaft including a collar secured intermediate thereon that connects to one end of a spring means that is telescoped over said shaft, which spring means opposite end is connected to a sleeve that is also telescoped over said shaft end distal from said coupling to said flow control means, which sleeve includes a handle means secured across its end, with said spring means fitted through said sleeve to bias said handle means outwardly, which handle means is arranged for turning by an operator from without the freezing machine housing and includes, opposite to the end of said shaft, an engaging means for coupling to and turning said shaft; means on said shaft end for coupling to and to be turned by said engaging means when the handle means is depressed against the biasing of said spring means; and stop means to limit travel of said handle means responsive to said spring biasing.

12. A modular custard freezing machine as recited in claim 11, wherein the engaging means on the handle means is a blade and the means on the shaft end for receiving and coupling to said engaging means is a groove formed into and across said shaft end to receive said blade therein to be turned by said blade.

* * * * *